United States Patent
Blakely et al.

(10) Patent No.: US 12,050,266 B2
(45) Date of Patent: *Jul. 30, 2024

(54) SYSTEMS, METHODS AND APPARATUS FOR CHARACTERIZING STICK-UP HEIGHT, POSITION AND ORIENTATION OF A DRILL PIPE

(71) Applicant: TRANSOCEAN SEDCO FOREX VENTURES LIMITED, Grand Cayman (KY)

(72) Inventors: Charles Blakely, Houston, TX (US); Bradley J. Prevost, Pearland, TX (US)

(73) Assignee: TRANSOCEAN SEDCO FOREX VENTURES LIMITED, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 18/112,176

(22) Filed: Feb. 21, 2023

(65) Prior Publication Data

US 2024/0027620 A1 Jan. 25, 2024

Related U.S. Application Data

(63) Continuation of application No. 16/571,735, filed on Sep. 16, 2019, now Pat. No. 11,585,932.
(Continued)

(51) Int. Cl.
*G01S 17/00* (2020.01)
*E21B 19/16* (2006.01)
(Continued)

(52) U.S. Cl.
CPC ............ *G01S 17/86* (2020.01); *E21B 19/161* (2013.01); *G01C 9/00* (2013.01); *G01S 17/42* (2013.01); *G01S 17/89* (2013.01)

(58) Field of Classification Search
CPC .......... G01S 17/86; G01S 17/42; G01S 17/89; E21B 19/161; G01C 9/00
See application file for complete search history.

(56) References Cited

U.S. PATENT DOCUMENTS

| | | | |
|---|---|---|---|
| 10,975,637 | B2 | 4/2021 | Pilgrim et al. |
| 10,975,681 | B2 | 4/2021 | Ruehmann et al. |

(Continued)

OTHER PUBLICATIONS

International Search Report and Written Opinion issued by the International Searching Authority for Application No. PCT/US2019/051286, dated Nov. 15, 2019, 13 pages.

*Primary Examiner* — Elaine Gort
*Assistant Examiner* — Brittany Renee Peko
(74) *Attorney, Agent, or Firm* — Panitch Schwarze Belisario & Nadel LLP

(57) ABSTRACT

A processor is operably coupled to a time of flight (TOF) camera, a light detection and ranging (LIDAR) sensor, and an optical camera. The processor can receive a TOF signal representative of a first coordinate associated with a stick-up height of a tool joint of a pipe of a drill string during a tripping operation on a rig drill floor, and a pitch and a roll of the tool joint. The processor can receive a LIDAR signal representative of a second coordinate associated with the stick-up height, and the pitch of the tool joint. The processor can receive an optical camera signal representative of a third coordinate associated with the stick-up height of the tool joint and the roll of the tool joint. The processor can generate a pose estimate and an orientation estimate based on the signals.

12 Claims, 8 Drawing Sheets

Related U.S. Application Data

(60) Provisional application No. 62/732,225, filed on Sep. 17, 2018.

(51) Int. Cl.
    *G01C 9/00*     (2006.01)
    *G01S 17/42*     (2006.01)
    *G01S 17/86*     (2020.01)
    *G01S 17/89*     (2020.01)

(56) References Cited

U.S. PATENT DOCUMENTS

| | | |
|---|---|---|
| 2010/0135750 A1 | 6/2010 | Tarique |
| 2011/0296923 A1* | 12/2011 | Cataldo .................. G01N 29/00 73/632 |
| 2013/0275100 A1 | 10/2013 | Ellis et al. |
| 2013/0345878 A1 | 12/2013 | Austefjord et al. |
| 2014/0233804 A1 | 8/2014 | Gustavsson et al. |
| 2015/0221079 A1 | 8/2015 | Schultz et al. |
| 2019/0119996 A1 | 4/2019 | Ly et al. |
| 2019/0136650 A1 | 5/2019 | Zheng et al. |
| 2019/0195034 A1 | 6/2019 | Leite |
| 2019/0302310 A1* | 10/2019 | Fox ...................... G01V 99/005 |
| 2020/0149360 A1 | 5/2020 | Traaserud |
| 2020/0157893 A1 | 5/2020 | Jorud |

\* cited by examiner

SYSTEMS, METHODS AND APPARATUS FOR CHARACTERIZING STICK-UP HEIGHT, POSITION AND ORIENTATION OF A DRILL PIPE

CROSS-REFERENCE TO RELATED APPLICATIONS

This application is a continuation of U.S. patent application Ser. No. 16/571,735, entitled "Systems, Methods and Apparatus for Characterizing Stick-Up Height, Position and Orientation of a Drill Pipe," filed Sep. 16, 2019, which claims priority to U.S. Provisional Application No. 62/732,225 entitled "Systems, Methods and Apparatus for Characterizing Stick-Up Height, Position and Orientation of a Drill Pipe", filed Sep. 17, 2018, the entire contents of all of which are incorporated herein by reference.

FIELD OF THE DISCLOSURE

Embodiments of the current disclosure are directed toward rig drill floor operations, and more particularly, apparatus, methods and systems for identifying a stick-up height, pose, and/or orientation of a drill pipe.

BACKGROUND

Drilling environments in the energy industry can be harsh on equipment such as drill bits, pipes, tool joints, etc., requiring their replacement when the equipment are no longer able to function adequately. When replacing distressed equipment, pipes are pulled out of, and put back into, wellbores in processes respectively known as tripping out and tripping in. Tripping is generally viewed as an unproductive use of time and traditionally includes human intervention. Human intervention in some instances limits efficiency and introduces undesirable variability into the tripping process. Accordingly, there is a desire to automate the processes associated with tripping to reduce the inefficiencies and variability resulting from human intervention, including, for example, at least some operations of iron roughnecks that are used to make or break the threaded joints of a drill string. In such instances, proper placement of the iron roughneck relative to the drill string involves a very small margin of error, and so automating the iron roughneck allows for repeatable and predictable placement of the iron roughneck within that margin of error, thereby optimizing the tripping process. To ensure proper placement of the iron roughneck for tripping purposes, for example, there is a need for accurate detection of the location and orientation of certain components of the drill string (e.g., the tool joint of a pipe extending upward from the slip).

SUMMARY

In some embodiments, a processor is operably coupled to a time of flight (TOF) camera, a light detection and ranging (LIDAR) sensor, and an optical camera. The processor can receive from the TOF camera a TOF signal representative of a first coordinate associated with a stick-up height of a tool joint of a pipe of a drill string during a tripping operation on a rig drill floor, a TOF signal representative of a pitch of the tool joint, and a TOF signal representative of a roll of the tool joint. The processor can receive from the LIDAR sensor a LIDAR signal representative of a second coordinate associated with the stick-up height of the tool joint, and a LIDAR signal representative of the pitch of the tool joint. The processor can receive from the optical camera an optical camera signal representative of a third coordinate associated with the stick-up height of the tool joint and an optical camera signal representative of the roll of the tool joint. The processor can generate a pose estimate of the stick-up height of the tool joint based on the first coordinate, the second coordinate, and the third coordinate. The processor can generate an orientation estimate of the tool joint based on the TOF signal representative of the pitch of the tool joint, the TOF signal representative of the roll of the tool joint, the LIDAR signal representative of the pitch of the tool joint, and the optical camera signal representative of the roll of the tool joint. The processor can send an instruction signal, based on the pose estimate and the orientation estimate, such that a roughneck on the rig drill floor moves relative to the tool joint.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1A:
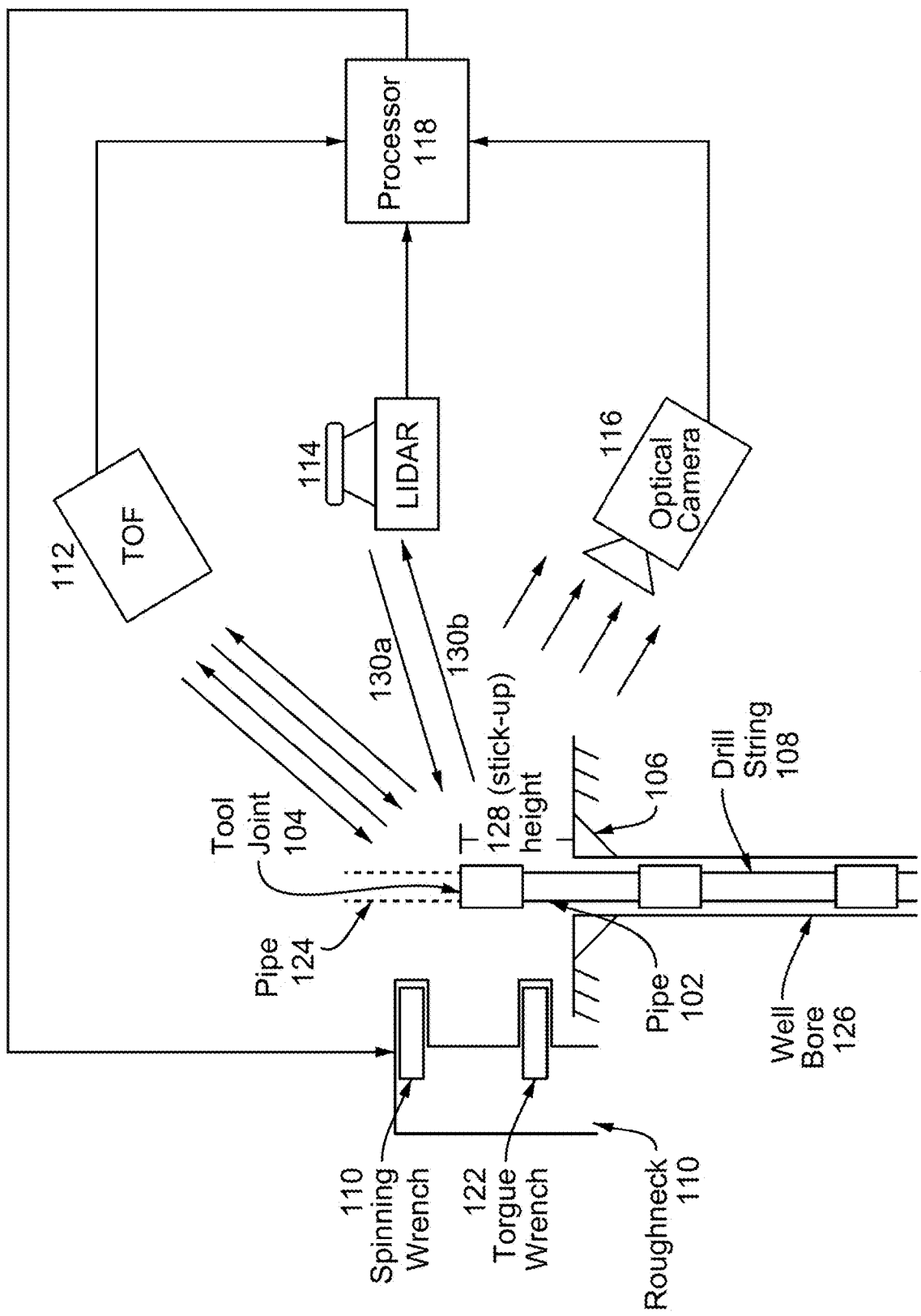
FIG. 1A is an example block diagram illustrating the characterization of the stick-up height and orientation of the tool-joint of a pipe during a trip-in or trip-out process so that accurate positions for placing the spinning wrench and the torque wrench of a roughneck on the pipe can be accurately determined, according to some embodiments.

In some embodiments, a drill string can be used to drill wellbores, which are the holes that are formed in the Earth's sub-surface to facilitate the extraction of natural resources such as oil, gas, minerals, water, etc. A drill string may include a drill bit for cutting into the earth and a plurality of drill pipes connected at the tool joints of the pipes. To replace any worn out part of the drill string, in some embodiments, the drill string may be pulled out of the ground ("tripping out" process) or put back into the ground ("tripping in" process) by disconnecting or attaching, respectively, at least some tool joints of the pipes of the drill strings. For example, when replacing a drill bit, the drill string may be tripped out by pulling the string out of the wellbore while disconnecting some or all of the pipe connection points at the tool joints. Upon replacing the drill bit, in some embodiments, the drill string can be put back into the wellbore while attaching drill pipe(s) onto the drill string. It is to be noted that the tripping process is not limited to replacing drill bits, but can also be employed to replace other parts of the drill string such as the pipes themselves.

In some embodiments, an iron roughneck that includes a spinning wrench and a torque wrench may be used to attach or disconnect pipes at the tool-joints. For example, during a tripping out process, a drill string may be pulled out of a wellbore exposing a pipe connection point at the tool joints of the pipes and the torque wrench of a roughneck may be used to stabilize the drill string by locking onto the drill string below the pipe connection point while the spinning wrench locks onto the pipe above the pipe connection point and disconnects the threaded connection point by rotating the pipe relative to the drill string. During the tripping in process, the reverse may take place, a pipe being added to the drill string with the spinning wrench, locked onto the pipe, turning the pipe relative to the drill string to tighten the pipe onto the drill string at the tool joint, which then can be followed by the drill string being lowered into the wellbore.

In some embodiments, automating the proper placement of the iron roughneck (alternatively the spinning wrench and/or the torque wrench) on the drill string and/or pipes during a tripping in or tripping out process may enhance efficiency, amongst other things, and as such may be desirable. For example, the positions of the spinning wrench and/or the torque wrench within the roughneck may be adjusted so that when the roughneck makes contact with a drill string to form a pipe connection or disconnect it, the wrenches are positioned at least substantially accurately on the pipes adjacent to the pipe connection. In some embodiments, the at least substantially accurate positioning of the wrenches on the pipes may be facilitated by at least substantially accurate determination of the stick-up height of the drill string, i.e., the height of the drill string sticking out of the wellbore. In some embodiments, the stick-up height may be defined as the height to the top of the tool joint of the pipe that is a part of the drill string and sticking out of the wellbore. Further, in some embodiments, the orientation of the tool joint can also be used to improve upon the determination of the stick-up height and/or to facilitate the at least substantially accurate positioning of the wrenches on the pipes.

FIG. 1A presents an example block diagram illustrating the characterization of the stick-up height and orientation of the tool-joint of a pipe during a trip-in or trip-out process so that at least substantially accurate positions for placing the spinning wrench and/or the torque wrench of a roughneck on the pipe can be accurately determined, according to some embodiments. In some embodiments, a drill string 108 may be tripped in (i.e., put into) or tripped out (i.e., pulled out of) a wellbore 126 that includes a slip 106 at its mouth for suspending the drill string 108 in the wellbore 126. In some embodiments, during tripping in, an additional pipe 124 is being attached to the top pipe 102 of the drill string 108 (e.g., being attached to the tool joint 104 of the pipe 102 of the drill string 108) before the drill string is lowered into the wellbore 126, while during tripping out, the pipe 124 is being removed from the drill string 108 (e.g., disconnected from the tool joint 104 of the top pipe 102 of the drill string 108) before the drill string 108 is further pulled out to expose additional pipes or pipe joint tools. For example, the tool joint 104 may be threaded, and the attachment or detachment of the pipe 124 from the top pipe 102 may occur by screwing the pipe 124 onto or out of the tool joint 104 using the spinning wrench 120 and the torque wrench 122 of the roughneck 110.

As discussed above, in some embodiments, efficient attachment or detachment of the pipe 124 from the top pipe 102, including the use of substantially or fully automated techniques, may be facilitated by the at least substantially accurate determination of the stick-up height 128 and/or the orientation of the tool joint 104. In some embodiments, one or more sensing technologies, individually and/or in combination, may be utilized to at least substantially accurately determine or estimate the stick-up height 128 and/or the orientation of the tool joint 104. The use of a combination of a plurality of technologies may also aid with overcoming external limitations such as environmental effects as some technologies are less prone to such effects and the combined result would be robust against the limitations. In some embodiments, the stick-up height 128 can be the height of the part of the pipe jutting or sticking out of the wellbore 126 or drill floor. For example, the stick-up height can be understood as the height of the part of the pipe 102 sticking out from the drill floor or the mouth of the wellbore 126 to some selected position on the tool joint 104 of the same pipe 102; examples of said selected position including the top, bottom, middle, etc., of the tool joint 104.

Figure 1C:
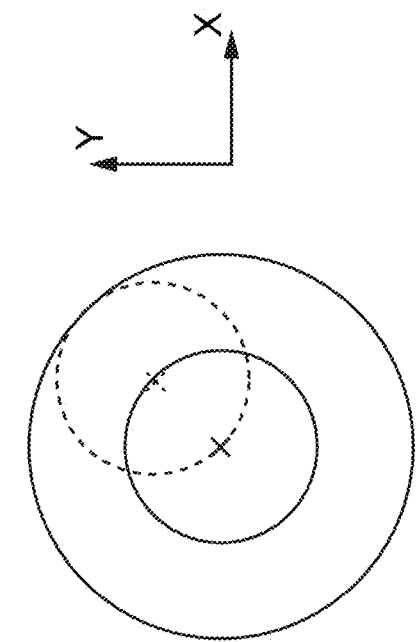
FIGS. 1B-E show various views of a pipe at a wellbore with non-zero pitch and/or roll characterizing an orientation of the pipe (and its associated tool joint), according to some embodiments.
Figure 1E:
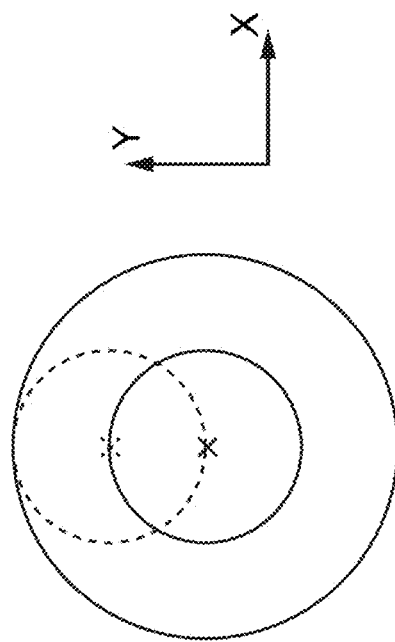
Figure 1B:
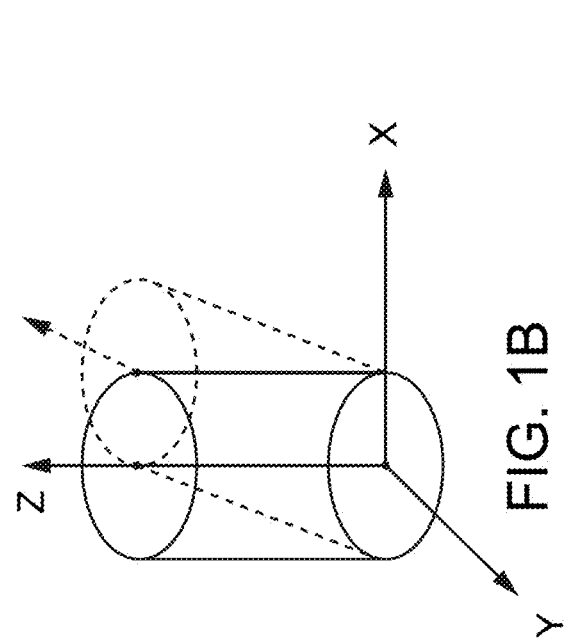
Figure 1D:
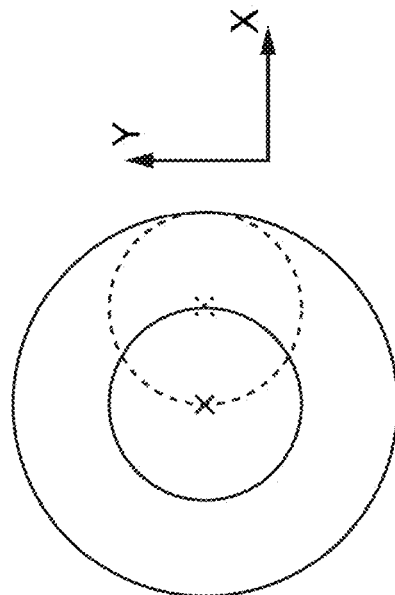

In some embodiments, the orientation of the tool joint 104 (or alternatively the pipe 102) may be characterized by one or more of the pitch, the roll and/or the yaw of the pipe 102. The roll, the pitch and the yaw can be defined as rotations about a three-dimensional (3D) body such as the pipe 102 about the three orthogonal axes defining the 3D body (e.g., the x-axis, the y-axis and the z-axis, respectively). For example, with reference to FIGS. 1B-E, the pipe 102 is shown to be offset from its longitudinal axis, indicating non-zero values for one or both of the pitch and the roll. FIGS. 1C-E, showing bird's-eye views of the x-y plane view of the pipe 102, illustrate a combination of a pitch and a roll, a pitch, and a roll, respectively.

In some embodiments, one or more of light detection and ranging (LIDAR) sensor 114, time of flight (TOF) camera/sensor 112 and optical camera (OC) 116 can be used to generate data that is then provided to a processor 118 for processing to determine or estimate the stick-up height 128 and/or the orientation of the tool joint 104. Upon the processor 118 determining or estimating the stick-up height 128 and/or the orientation of the tool joint 104, in some embodiments, the processor may then generate instructions to the roughneck 110 to adjust the positions of one or all of the spinning wrench 120, the torque wrench 122 and the roughneck 110 itself on the pipe 102 and/or the pipe 124 such that the attachment or detachment of pipe 124 to or from pipe 102 may occur efficiently and safely. For example, the attachment or detachment of pipe 124 to or from pipe 102 may occur in an automated fashion without human intervention, i.e., without a human adjusting the positioning of the roughneck 110 (or the spinning wrench 120 and/or the torque wrench 122). Further, with a sufficiently accurate estimate of the stick-up height and orientation of the pipe(s) 102, 124, an area or amount of surface contact between the roughneck 110 and the pipe(s) 102, 124 can be maximized and/or optimized such that transfer of force and/or torque from the roughneck 110 to the pipe(s) 102, 124 can be optimized.

In some embodiments, the LIDAR sensor 114 can be used to scan the pipe 102, and in particular the tool joint 104, with pulsed light waves 130a and receive the reflected pulses 130b, which allow for the determination of the profile of the pipe stand jutting out of the mouth of the wellbore 126 past the slip 106 (e.g., a 1D point cloud of the objects illuminated with the pulsed light waves, a one-dimensional ("1D") point cloud being a collection of points representing the 1D coordinates of the objects (and hence outlining shapes or features of the objects)). For example, the pulsed light waves 130a may be a laser, including laser having wavelength in the range from about 500 nm to about 1600 nm, wavelengths of about 532 nm, about 905 nm, about 1064 nm, about 1550 nm, etc., including values and subranges therebetween. In some embodiments, since the LIDAR sensor 114 produces its own light source, it may be at least substantially unaffected by variable lighting scenarios and may require little or no external light source.

In some embodiments, an analysis of the 1D point cloud collected by the LIDAR 114 provides the stick-up height 128 and the pitch, if any, of the tool joint 104 of the pipe 102 (e.g., the top-end portion of the tool joint 104). For example, with the LIDAR 114 directed at or near the pipe 102, reflected waves received by the LIDAR 114 within a certain time threshold or time range after transmission may be deemed to have been reflected by the pipe 102, while the rest may be considered to have been reflected by other objects in the surroundings. Further to this example, the LIDAR 114 can scan the pipe 102 in an upward direction along the Z-axis (i.e., in the vertical direction), and in turn the LIDAR 114 will receive and/or sense waves reflected from the pipe 102 until the LIDAR eventually scans above and/or beyond the pipe 102, in which case the LIDAR will receive and/or sense waves reflected from an object other than the pipe 102 or the LIDAR will not receive and/or sense any reflected waves (e.g., if there are no objects beyond or behind the pipe 102 that are within the LIDAR's range). The time period between the LIDAR's light transmission and receipt of one or more waves reflected from the pipe 102 will be different from the time period between the LIDAR's light transmission and receipt of one or more waves reflected from an object other than the pipe 102 (and/or not receiving reflected waves at all). This difference in time can be used to identify the stick-up height 128 of the pipe 102. As such, by analyzing the 1D point cloud obtained as the LIDAR 114 is scanning along the height of the pipe, in some embodiments, data from the LIDAR 114 can be used to identify which data points belong to reflections from the pipe 102 and extract or calculate the stick-up height 128 of the tool joint 104 from the profile of the identified data points. Further, data from the LIDAR 114 may also be used to detect and determine or estimate a pitch of the pipe 102 from the same identified data points, as the arrival times of the reflected waves would be different than what would be expected if the pipe 102 was not tilted (i.e., a pitch in the pipe 102 would result in changes in arrival times of the reflected waves that reflect from contact with the pipe). For example, an arrival time for a reflection from a first transmitted wave that is greater than an arrival time for a reflection from a second transmitted wave as the LIDAR scans upward may indicate that the pipe 102 is pitched towards the LIDAR 114. Accordingly, an analysis of the 1D point cloud can provide the stick-up height 128 and pitch of the tool joint 104, facilitating the at least substantially accurate determination of the top of the tool joint 104 that may be configured to receive another pipe 124 during tripping in, or from which the pipe 124 can be detached or removed during tripping out.

In some embodiments, a TOF camera or sensor 112 can also be used to obtain height and/or orientation data related to the tool joint 104. A TOF sensor 112 may be a scannerless device that can illuminate an entire scene of interest (e.g., the tool joint 104 as well as the pipe 102, the slip 106, and/or the pipe 124 if present and of interest, etc.) with light emitted from a laser source in the TOF sensor 112, and then receive the reflected light for processing to determine and/or estimate the stick-up height 128 and/or the orientation of the tool joint 104. In some embodiments, and similar to a LIDAR detector, the TOF sensor 112 receives and measures reflections of its own emitted light; as such, the TOF sensor 112 is at least substantially immune to effects of external light sources such as ambient light. Based on the reflected light, and in particular based on phase and/or travel time information in the reflected light when compared to the transmitted light, in some embodiments, the TOF sensor 112 can extract a three-dimensional ("3D") point cloud of the scene of interest, which allows for the at least substantially accurate determination and/or estimation of one or both of the height (e.g., stick-up height) and/or orientation of the tool joint 104. For example, the 3D point cloud allows for the extraction of the stick up height 128 as well as two degrees of freedom in the orientation of the pipe 102/the tool joint 104, the pitch and the roll. Based on the extracted stick-up height 128, the pitch and/or the roll, in some embodiments, the TOF sensor 112 can at least substantially accurately determine the location of the top of the tool joint 104 that may be configured to receive another pipe 124 during tripping in, or from which the pipe 124 can be detached or removed during tripping out.

In some embodiments, an optical camera ("OC") 116 may also be used to obtain an image of the tool joint 104 (and its surroundings including the pipe 102), and convolutional neural networks (CNNs) may be applied to the two-dimensional ("2D") image to extract or recover a 3D reconstruction of the tool joint 104 and the pipe 102, thereby allowing for an at least substantially accurate determination or estimate of its height and/or orientation. In some embodiments, the CNNs may be trained to recognize the pipe 102 (and its part the tool joint 104) from images obtained by the OC 116 by training the CNNs with a variety of pipe and/or tool joint 104 types (e.g., shapes, features, color, etc.), pipe and/or tool joint 104 sizes (e.g., diameters, lengths, etc.), weather conditions (of the location of the wellbore 126), ambient light conditions, etc. With the CNN's learning-based recognition of the pipe 102 and the tool joint 104, in some embodiments, the stick-up height 128 and the orientation of the tool joint 104 can be determined or estimated. For example, the CNN can be trained to determine or estimate the stick-up height 128 and/or the roll of the tool joint 104 based on images obtained by the OC 116, allowing for the at least substantially accurate determination of the top of the tool joint 104 that may be configured to receive another pipe 124 during tripping in, or from which the pipe 124 can be detached or removed during tripping out.

As discussed above, data on the stick-up height 128 and/or orientation (e.g., pitch, roll) of the tool joint 104 may be obtained from a variety of methods or techniques, i.e., using one or more of the LIDAR sensor 114, the TOF camera 112 and/or the OC 116. In some embodiments, the data obtained from these sources may be combined to extract more accurate values for the stick-up height and/or the orientation of the tool joint 104, and as a consequence a more accurate determination for the location of the top of the tool joint 104. For example, the processor 118 may receive these data from one or more of the LIDAR sensor 114, the TOF camera 112 and/or the OC 116, and proceed to calculate the averages for each quantity (i.e., stick-up height, pitch and roll) to obtain the enhanced values. In some embodiments, the results obtained from some methods, techniques or device types can be given more weight in comparison to others based on, for example, ambient and/or environmental conditions. For example, if the data were taken during poor weather or light conditions, the data from the LIDAR sensor 114 and the TOF camera 112 may be given more weight in comparison to data from the OC 116. In some embodiments, the use of a variety of techniques and methods to determine the stick-up height and the orientation of the tool joint 104 allows for the results to be robust against harsh environmental conditions such as darkness, rain, etc.

Figure 2:
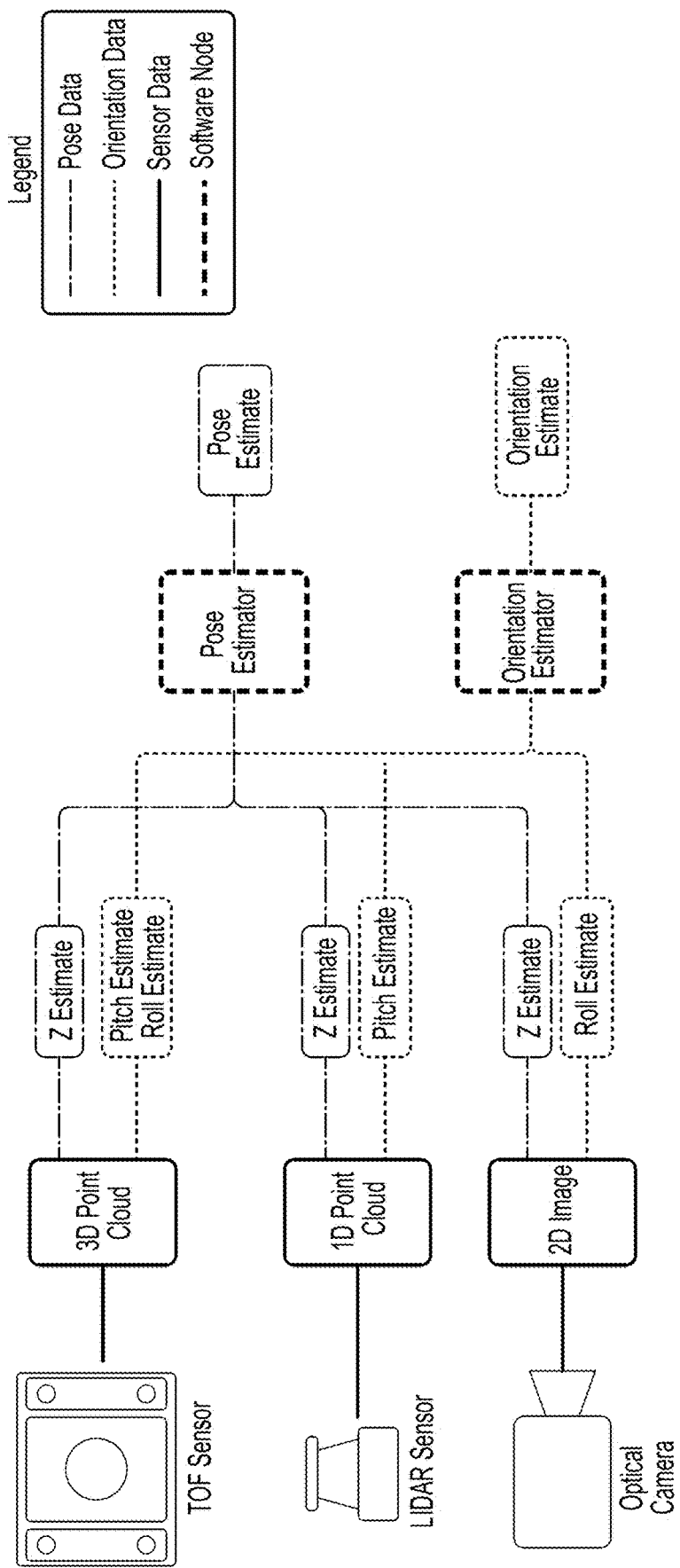
FIG. 2 shows a flowchart illustrating the calculation of the stick-up height and orientation of the tool-joint of a pipe during a trip-in or trip-out process so that accurate positions for placing the spinning wrench and the torque wrench of a roughneck on the pipe can be accurately determined, according to some embodiments.

FIG. 2 shows an example flowchart illustrating the determination of the stick-up height, pose, and orientation of the pipe as discussed above, according to some embodiments. As shown, a system may include a pose estimator to generate a pose estimate of a drill pipe based on Z estimates of the stick-up height of the drill pipe based on signals generated by the TOF sensor, the LIDAR sensor, and the optical camera. Further, the system may include an orientation estimator to generate an orientation estimate of the drill pipe based on a pitch and roll estimate generated from the TOF sensor, a pitch estimate generated from the LIDAR sensor, and a roll estimate generated from the optical camera, as described in further detail herein.

Further to the discussion herein with respect to the 3D point cloud data, in some embodiments, when evaluating the point cloud data, estimation of pitch and roll values can be calculated by associating and/or fitting cylinders to the point cloud data. In turn, orientation can be obtained based at least in part on the cylinders discovered. The 1D point cloud, on the other hand, provides data in a single plane. The sensor (e.g., the LIDAR sensor) can be positioned in a way that the 1D point cloud data intersects the pitch plane. Fitting a line through the data will thereby inherently give the pitch value. Further, similar to as discussed in more detail here, the optical data provides the ability to determine the roll estimate. To this end, a line detection algorithm can be defined and/or used to identify and/or find the edges of the pipe. The angle of the line in reference to the ground plane can be used to identify the roll value.

Referring back to FIG. 1, upon the processor 118 determining or estimating an enhanced or more accurate value for the stick-up height 128 and/or the orientation of the tool joint 104, in some embodiments, the processor may then generate and/or send instructions to the roughneck 110 to adjust the positioning of one or all of the spinning wrench 120, the torque wrench 122 and the roughneck 110 itself on the pipe 102, the tool joint 104 and/or the pipe 124 (e.g., in connection with a tripping in or tripping out operation).

Figure 3B:
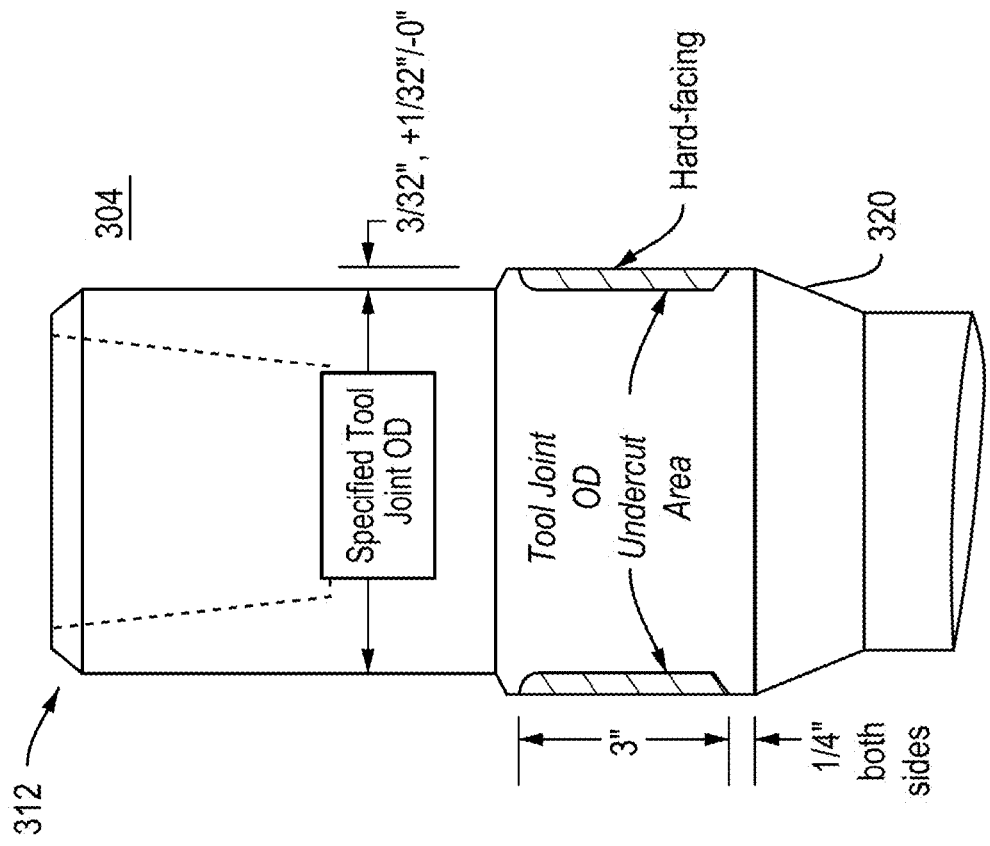
FIG. 3B illustrates an example tool joint, according to some embodiments.
Figure 3A:
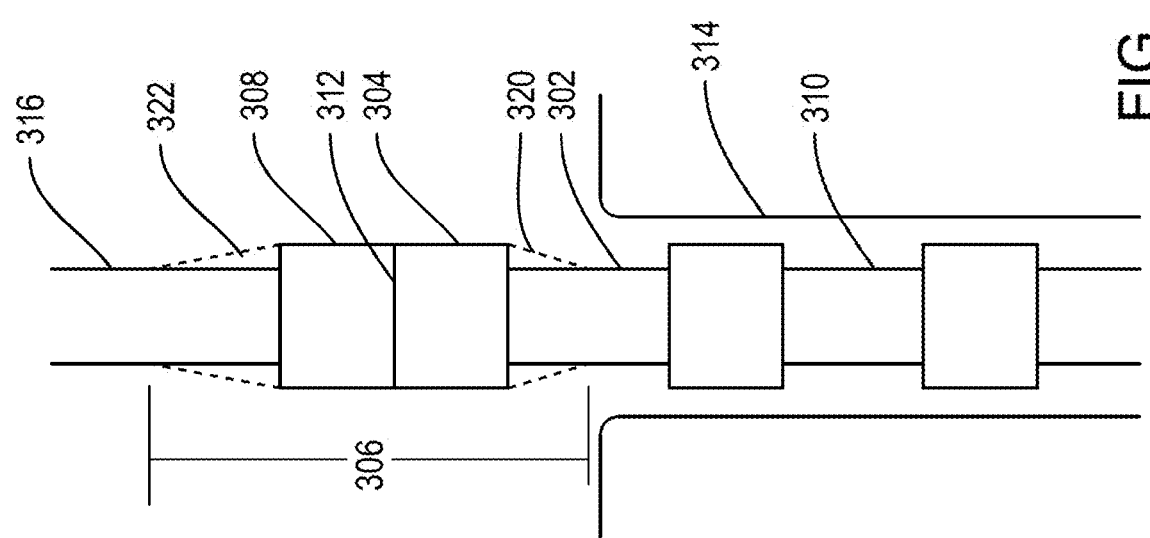
FIG. 3A illustrates a drill string having a portion extending from a well bore.

In some embodiments, a combination of two or more of the LIDAR sensor 114, the TOF camera 112 or the OC 116 can be used to determine the location of the seam between pipes (e.g., between the tool joints of the pipes) during a tripping out process. For example, an accurate determination of the location of the seam allows the roughneck to be directed to and/or placed on the pipes accurately and in an automated fashion such that detaching or separating of the pipes can occur routinely and in a repeatable manner without human intervention. With reference to FIG. 3A, a drill string 310 and wellbore 314 are shown in which pipes 302, 316 are connected to each other above the wellbore 314 and via their respective tool joints 304, 308. FIG. 3B illustrates an example of tool joint 304. In some embodiments, identifying the location of the seam 312, i.e., where the pipes 302, 316 meet, would be useful in determining where on the pipes the roughneck should make contact to separate the pipes 302, 316. In such cases, a LIDAR sensor can be used to scan the pipes 302, 316, including particular identifying portions of the pipes 302, 316, such as the shoulders 320, 322, using pulsed light waves to generate a 1D point cloud of the shoulders 320, 322 (which can be used to identify the transitions to the tool joints 304, 308 from the remainder of the pipes 302, 316). The 1D point cloud provides the profile of the pipes 302, 316, which includes the transitions of the shoulders 320, 322 into the tool joints 304, 308 before terminating at the seam where the two pipes 302, 316 meet. As such, by analyzing the 1D point cloud, in some embodiments, a region of interest (ROI) 306 encompassing the shoulders 320 and 322, and including the seam 312 therein, can be identified. In some embodiments, a TOF sensor can also be used to generate a 3D point cloud, from which the ROI 306 can be identified. In some embodiments, a CNN may also be utilized to analyze images of the pipes 302, 316, and in particular images of the shoulders 320, 322, and/or any other suitable landmark (such as a fiducial attached to and/or apart of the pipe(s)) to identify the ROI 306. In some embodiments, by combining the results of the LIDAR sensor, the TOF sensor and/or the CNN, an average and/or calculated (e.g., weighted calculation) ROI 306 that includes the seam 312 may be defined.

In some embodiments, upon the identification of the ROI, the CNN may process images of the ROI to determine the location of the seam 312 within the ROI and identify one or more possible candidate locations for the seam 312. Further, in some embodiments, the LIDAR sensor and the TOF sensor may also be used to determine the location of the seam 312 and/or obtain a more accurate location of it (e.g., if the CNN does not return a valid candidate or too many candidates are identified). In some embodiments, the location of the seam 312 may be obtained with a certain confidence or probability level. In some embodiments, the probability level may not be 100% (e.g., when the edge of the tool-joint of a pipe is beveled and visibility is poor). In such embodiments, a threshold (e.g., user-defined threshold) can be used to determine if the probability level is high enough, and if so, the obtained location of the seam 312 can be deemed accurate and/or sufficient for directing the roughneck. In some embodiments, and in particular if the CNN fails to locate the seam (e.g., if the above probability level falls below the threshold), the equidistant point between the two tool-joints 304, 308 may be considered as the seal 312 location.

Figure 4A:
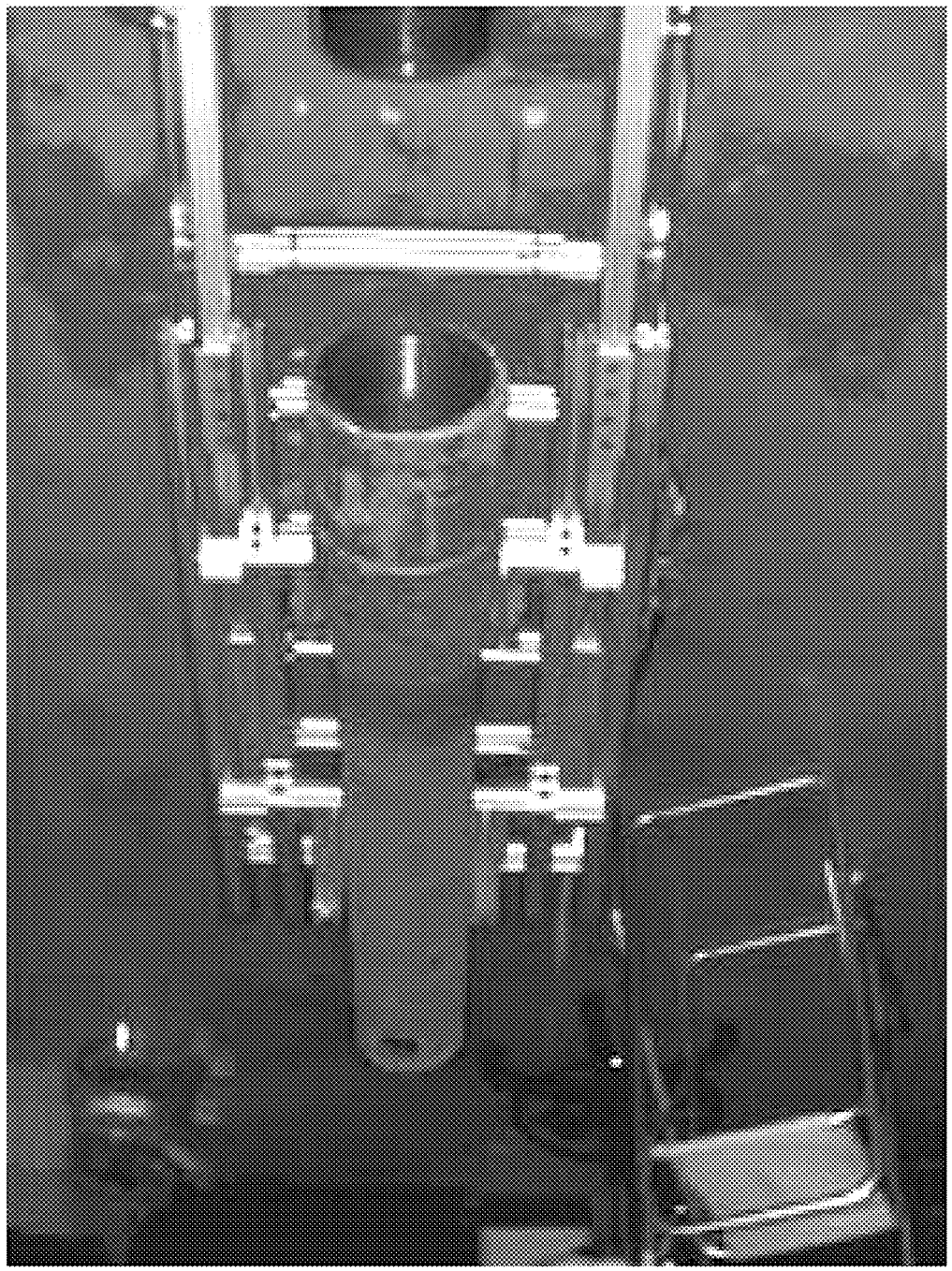
FIGS. 4A-4D show example images of an experimental demonstration of the characterization of the stick-up height and orientation of a drill pipe based on the embodiments disclosed herein, according to some embodiments.
Figure 4B:
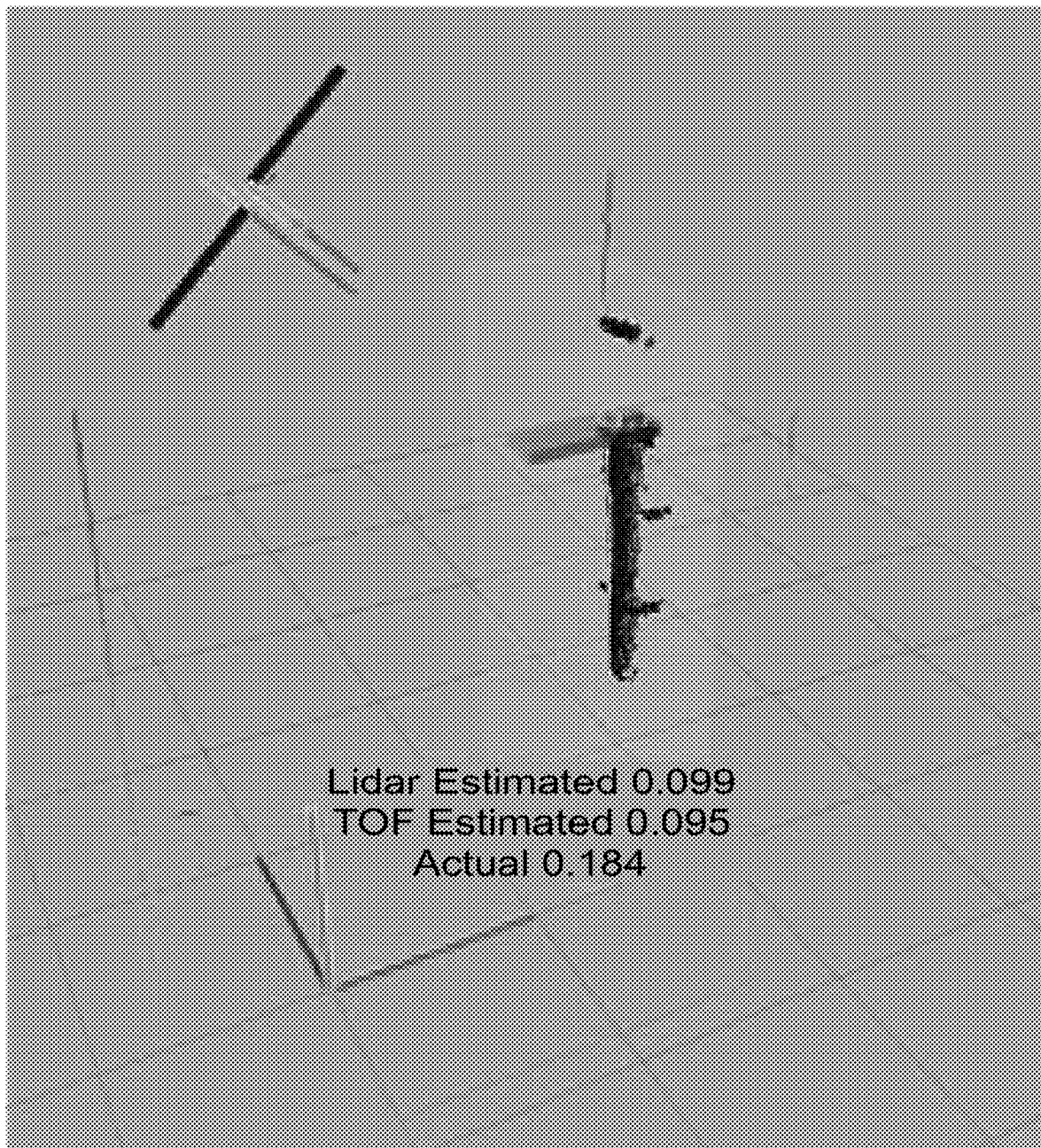
Figure 4C:
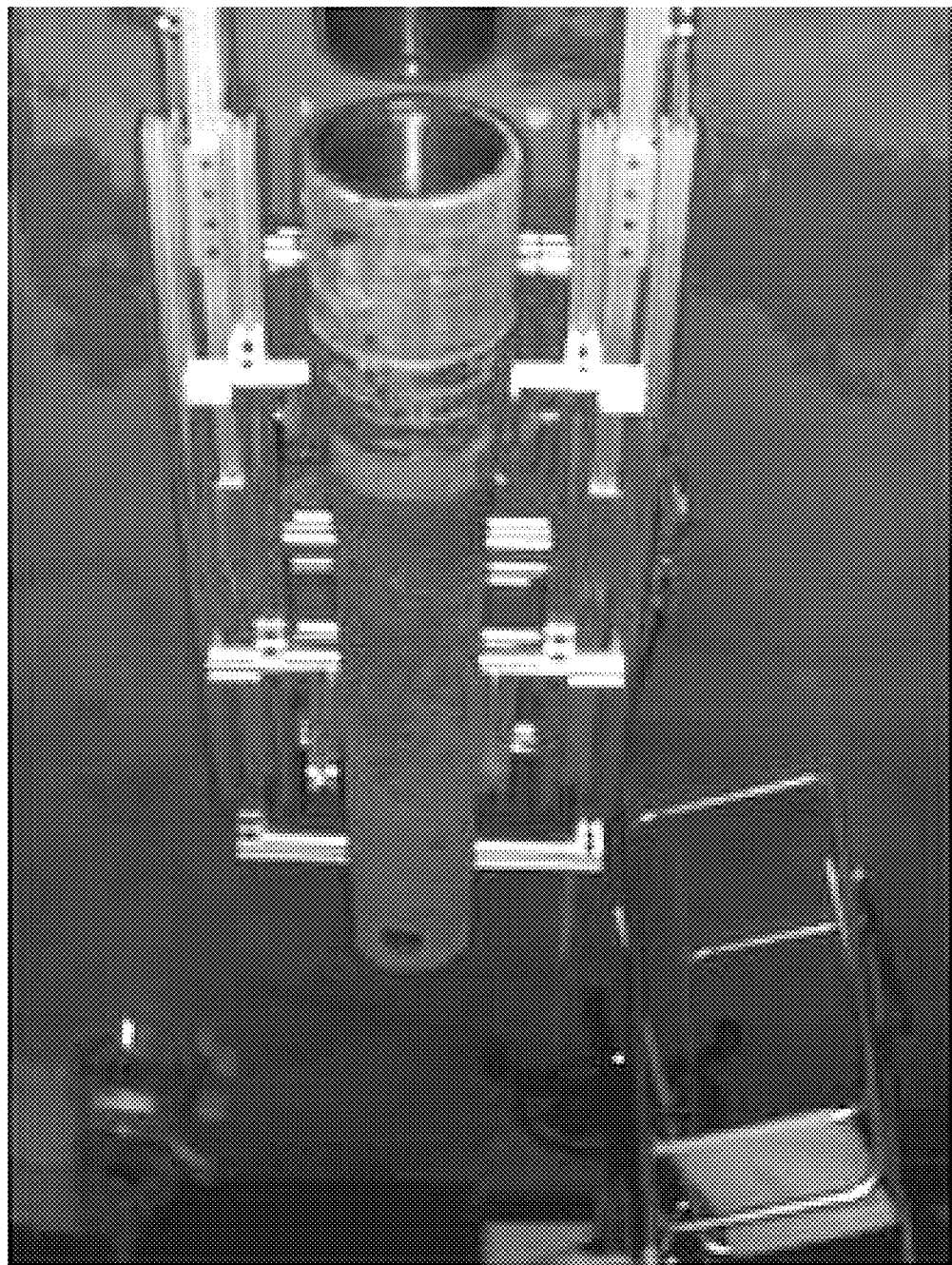
Figure 4D:
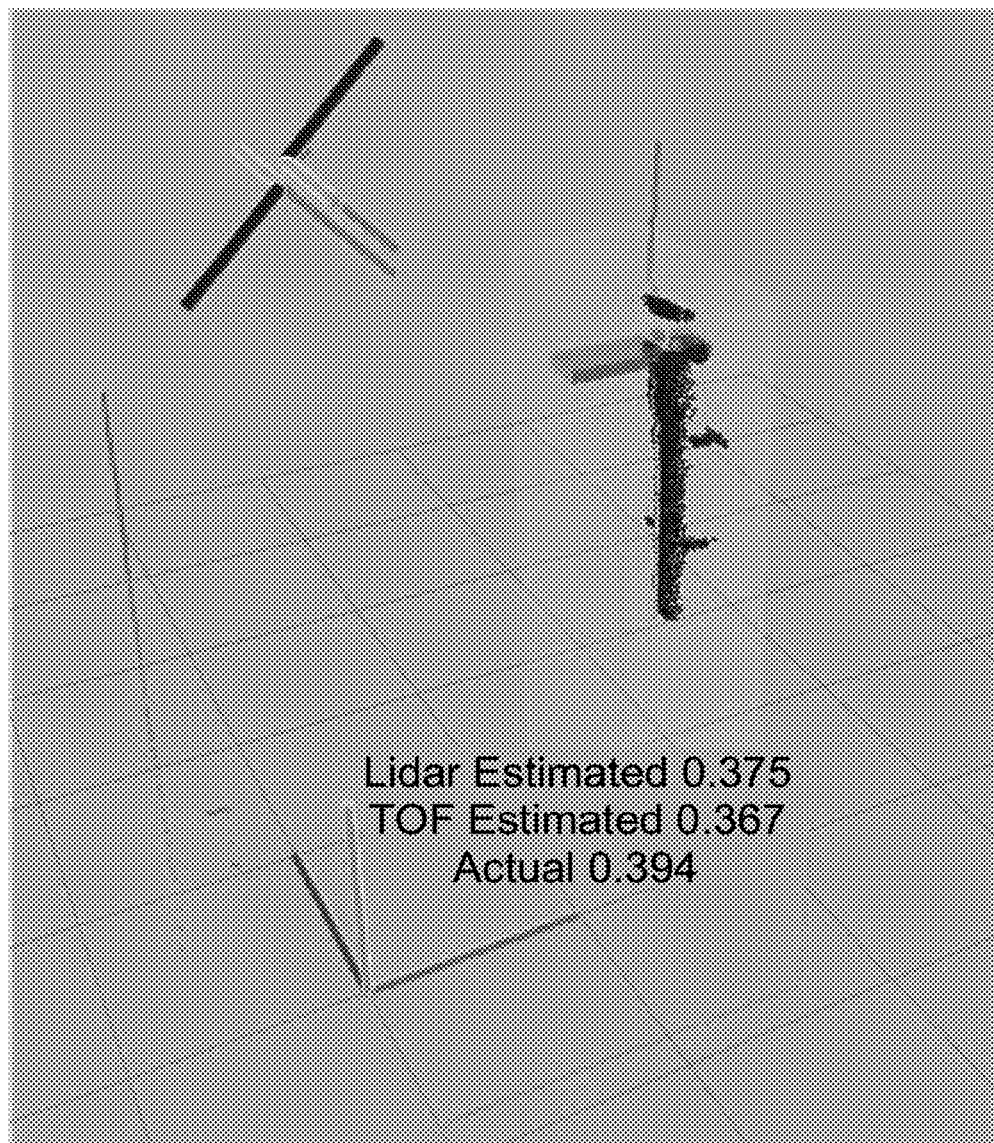

FIGS. 4A-D show example images of an experimental demonstration of the characterization of the stick-up height and orientation of a drill pipe based on the embodiments disclosed herein, according to some embodiments. FIGS. 4B and 4D show cloud points obtained from LIDAR and TOF sensor measurements of the drill pipe shown in the optical camera images in FIGS. 4A and 4C, respectively. The locations of the top of the pipe as determined by the LIDAR and the TOF sensors are fairly close to the actual results, illustrating the applicability of the systems, apparatus and methods disclosed herein for characterizing stick-up heights and orientations of drill pipes.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of the present technology may be implemented using hardware, firmware, software or a combination thereof. When implemented in firmware and/or software, the firmware and/or software code can be executed on any suitable processor or collection of logic components, whether provided in a single device or distributed among multiple devices.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The invention claimed is:

1. An apparatus, comprising
a time of flight (TOF) camera;
an optical camera; and
a processor operably coupled to the TOF camera and the optical camera, the processor configured to receive, from the TOF camera, (1) a TOF signal representative of a first coordinate associated with a stick-up height of a tool joint of a pipe of a drill string during a tripping operation on a rig drill floor, (2) a TOF signal representative of a pitch of the tool joint, and (3) a TOF signal representative of a roll of the tool joint,
the processor configured to receive, from the optical camera, (1) an optical camera signal representative of a second coordinate associated with the stick-up height of the tool joint, and (2) an optical camera signal representative of the roll of the tool joint,
the processor configured to generate a pose estimate of the stick-up height of the tool joint based on received stick-up measurement data, the received stick-up measurement data including the first coordinate and the second coordinate,
the processor configured to generate an orientation estimate of the tool based on received orientation measurement data, the received orientation measurement data including the TOF signal representative of the pitch of the tool joint, the TOF signal representative of the roll of the tool joint, and the optical camera signal representative of the roll of the tool joint,
the processor configured to send an instruction signal such that a roughneck on the rig drill floor moves relative to the tool joint based on the pose estimate and the orientation estimate.

2. The apparatus of claim 1, wherein:
the TOF signal representative of the first coordinate, the TOF signal representative of the pitch of the tool joint, and the TOF signal representative of the roll of the tool joint are generated based at least in part on a three-dimensional point cloud.

3. The apparatus of claim 1, wherein:
the optical camera signal representative of the second coordinate and the optical camera signal representative of the roll of the tool joint are based at least in part on two-dimensional image data.

4. The apparatus of claim 1, wherein:
the processor is configured to send the instruction signal such that the roughneck on the rig drill floor moves towards and into operable engagement with the pipe of the drill string.

5. The apparatus of claim 1, further comprising a light detection and ranging (LIDAR) sensor operably coupled to the processor,
wherein the processor is configured to receive, from the LIDAR sensor, a LIDAR signal representative of a third coordinate associated with the stick-up height of the tool joint, and wherein the received stick-up measurement data further includes the third coordinate.

6. The apparatus of claim 1, further comprising a light detection and ranging (LIDAR) sensor operably coupled to the processor,
wherein the processor is configured to receive, from the LIDAR sensor, a LIDAR signal representative of the pitch of the tool joint, and
wherein the received orientation measurement data further includes the LIDAR signal representative of the pitch of the tool joint.

7. A method, comprising:
receiving, at a processor and from a time of flight (TOF) camera, (1) a TOF signal representation of a first coordinate associated with a stick-up height of a tool joint of a pipe of a drill string during a tripping operation on a rig drill floor, (2) a TOF signal representative of a pitch of the tool joint, and (3) a TOF signal representative of a roll of the tool joint;
receiving, at the processor and from an optical camera, (1) an optical camera signal representative of a second coordinate associated with the stick-up height of the tool joint, and (2) an optical camera signal representative of the roll of the tool joint;
generating, at the processor, a pose estimate of the stick-up height of the tool joint based on received stick-up measurement data, the received stick-up measurement data including the first coordinate and the second coordinate;
generating, at the processor, an orientation estimate of the tool joint based on received orientation measurement data, the received orientation measurement data including the TOF signal representative of the pitch of the tool joint, the TOF signal representative of the roll of the tool joint, and the optical camera signal representative of the roll of the tool joint; and
sending, from the processor, an instruction signal such that a roughneck on the rig drill floor moves relative to the tool joint based on the pose estimate and the orientation estimate.

8. The method of claim 7, wherein:
the TOF signal representative of the first coordinate, the TOF signal representative of the pitch of the tool joint, and the TOF signal representative of the roll of the tool joint are generated based at least in part on a three-dimensional point cloud.

9. The method of claim 7, wherein:
the optical camera signal representative of the second coordinate and the optical camera signal representative of the roll of the tool joint are based at least in part on two-dimensional image data.

10. The method of claim 7, wherein:
the sending the instruction signal includes sending the instruction signal such that the roughneck on the rig drill floor moves towards and into operable engagement with the pipe of the drill string.

11. The method of claim 7, further comprising:
receiving, at the processor and from a light detection and ranging (LIDAR) sensor, a LIDAR signal representative of a third coordinate associated with the stick-up height of the tool joint,
wherein the received stick-up measurement data further includes the third coordinate.

12. The method of claim 7, further comprising:
receiving, at the processor and from a light detection and ranging (LIDAR) sensor, a LIDAR signal representative of the pitch of the tool joint, wherein the received orientation measurement data further includes the LIDAR signal representative of the pitch of the tool joint.

\* \* \* \* \*